United States Patent
Mizikovsky

(10) Patent No.: US 10,187,917 B2
(45) Date of Patent: Jan. 22, 2019

(54) GENERATION OF MOBILE SESSION IDENTIFIER FOR NEUTRAL HOST NETWORK

(71) Applicant: Alcatel-Lucent USA Inc., Murray Hill, NJ (US)

(72) Inventor: Semyon Mizikovsky, Morganville, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/243,414

(22) Filed: Aug. 22, 2016

(65) Prior Publication Data

US 2018/0054839 A1    Feb. 22, 2018

(51) Int. Cl.
*H04W 12/06*      (2009.01)
*H04W 76/11*      (2018.01)
*H04W 16/14*      (2009.01)
*H04L 29/12*      (2006.01)

(52) U.S. Cl.
CPC ............ *H04W 76/11* (2018.02); *H04W 12/06* (2013.01); *H04W 16/14* (2013.01); *H04L 61/2038* (2013.01); *H04L 61/6054* (2013.01)

(58) Field of Classification Search
CPC ........................... H04W 76/021; H04W 12/06
USPC ............. 455/410, 411, 414.1, 418, 457, 550, 455/556.1, 560
See application file for complete search history.

(56) References Cited

U.S. PATENT DOCUMENTS

| | | | | |
|---|---|---|---|---|
| 5,337,344 A | * | 8/1994 | Alvesalo | H04Q 3/0016 455/403 |
| 2002/0083198 A1 | * | 6/2002 | Kim | H04L 29/12066 709/245 |
| 2014/0064246 A1 | | 3/2014 | Baillargeon | |
| 2014/0092785 A1 | * | 4/2014 | Song | H04L 1/00 370/280 |
| 2014/0331329 A1 | * | 11/2014 | Edge | G06F 21/606 726/26 |
| 2015/0148050 A1 | * | 5/2015 | Siomina | H04J 11/005 455/452.1 |

(Continued)

FOREIGN PATENT DOCUMENTS

WO    WO2015181677 A1    12/2015

OTHER PUBLICATIONS

ETSI, LTE; Evolved Universal Terrestrial Radio Access (E-UTRA) and Evolved Universal Terrestrial Radio Access Network (E-UTRAN); Overall Description; Stage 2 (3GPP TS 36.300 Version 8.9.0 Release 8), ETSI TS 136 300, Jul. 2009, 163 pages.

(Continued)

*Primary Examiner* — Congvan Tran
(74) *Attorney, Agent, or Firm* — Ryan, Mason & Lewis, LLP

(57) ABSTRACT

An identifier of a mobile session is generated for a mobile device accessing a network operating in an unlicensed radio band (e.g., Neutral Host Network). Generation of at least one part of the identifier comprises generating a random binary value, converting the random binary value into a decimal value, and truncating the decimal value to a number of decimal digits consistent with an identifier recognizable by a network operating in a licensed radio band (e.g., 3GPP Evolved Packet Core).

27 Claims, 4 Drawing Sheets

(56) References Cited

U.S. PATENT DOCUMENTS

| | | | |
|---|---|---|---|
| 2016/0014127 A1* | 1/2016 | Mohebbi | H04W 12/06 |
| | | | 455/411 |
| 2016/0219590 A1 | 7/2016 | Khawer et al. | |
| 2016/0270141 A1* | 9/2016 | Sharma | H04W 76/026 |
| 2016/0366717 A1* | 12/2016 | Yang | H04B 1/69 |
| 2017/0034767 A1* | 2/2017 | Griot | H04W 48/10 |
| 2018/0035334 A1* | 2/2018 | Lohar | H04W 36/0016 |

OTHER PUBLICATIONS

3GPP, "3rd Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3 (Release 8)," 3GPP TS 29.274, V8.0.0, Dec. 2008, 111 pages.

3GPP, "3rd Generation Partnership Project; Technical Specification Group Services and System Aspects; Architecture Enhancements for Non-3GPP Accesses (Release 10)," 3GPP TS 23.402, V10.7.0, Mar. 2012, 232 pages.

3GPP, "3rd Generation Partnership Project; Technical Specification Group Services and System Aspects; General Packet Radio Service (GPRS) Enhancements for Evolved Universal Terrestrial Radio Access Network (E-UTRAN) Access (Release 8)," 3GPP TS 23.401, V8.0.0, Dec. 2007, 167 pages.

3GPP, "3rd Generation Partnership Project; Technical Specification Group Core Network; Numbering, Addressing and Identification (Release 5)," 3GPP TS 23.003, V5.11.0, Jun. 2006, 39 pages.

3GPP, "3rd Generation Partnership Project; Technical Specification Group Services and Systems Aspects; Network Architecture (Release 4)," 3GPP TS 23.002, V4.8.0, Jun. 2003, 39 pages.

International Telecommunication Union, "Series E: Overall Network Operation, Telephone Service, Service Operation and Human Factors—International Operation—Maritime Mobile Service and Public Land Mobile Service—The International Identification Plan for Mobile Terminals and Mobile Users," ITU-T E.212, May 2004, 16 pages.

Multefire, "Multefire Alliance Formed to Bring Enhanced Wireless Performance to Unlicensed Spectrum," http://www.multifire.org/news/press-release-december-16-2015/, Dec. 16, 2015, 1 page.

Amitav Mukherjee, "Standalone LTE in Unlicensed Spectrum: Design Principles," https://www.ericsson.com/research-blog/lte/standalone-lte-unlicensed-spectrum-design-principles/, Jun. 1, 2016, 3 pages.

3GPP, "3rd Generation Partnership Project; Technical Specification Group Services and System Aspects; Study on the Security Aspects of the Next Generation System," 3GPP TR 33.899, V0.4.0, Aug. 2016, 156 pages.

"Liason Statement to Relevant External Organizations and Working Party 8A," Working Party Document 8F/TEMP/479 (Rev.3), ITU Radiocommunication Study Groups, Feb. 16, 2007, pp. 1-74.

* cited by examiner

| OCTETS | BITS | | | | | | | |
|---|---|---|---|---|---|---|---|---|
| | 8 | 7 | 6 | 5 | 4 | 3 | 2 | 1 |
| 1 | TYPE = 1 (DECIMAL) | | | | | | | |
| 2 TO 3 | LENGTH = n | | | | | | | |
| 4 | SPARE | | | | INSTANCE | | | |
| 5 | NUMBER DIGIT 2 | | | | NUMBER DIGIT 1 | | | |
| 6 | NUMBER DIGIT 4 | | | | NUMBER DIGIT 3 | | | |
| ... | ... | | | | ... | | | |
| n+4 | NUMBER DIGIT m | | | | NUMBER DIGIT m−1 | | | |

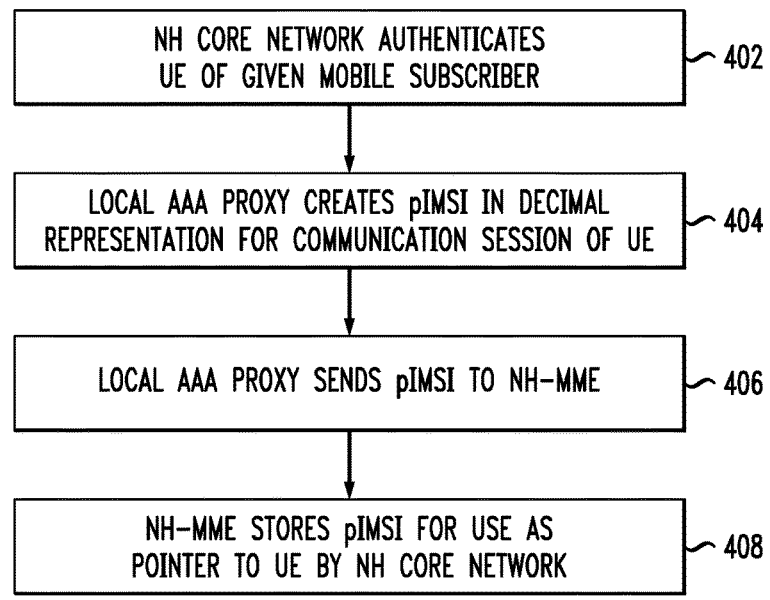

NH CORE NETWORK AUTHENTICATES UE OF GIVEN MOBILE SUBSCRIBER — 402

LOCAL AAA PROXY CREATES pIMSI IN DECIMAL REPRESENTATION FOR COMMUNICATION SESSION OF UE — 404

LOCAL AAA PROXY SENDS pIMSI TO NH-MME — 406

NH-MME STORES pIMSI FOR USE AS POINTER TO UE BY NH CORE NETWORK — 408

GENERATION OF MOBILE SESSION IDENTIFIER FOR NEUTRAL HOST NETWORK

FIELD

The application relates generally to communication networks, and more particularly, but not exclusively, to generating mobile session identifiers in communication networks.

BACKGROUND

This section introduces aspects that may be helpful to facilitating a better understanding of the inventions. Accordingly, the statements of this section are to be read in this light and are not to be understood as admissions about what is in the prior art or what is not in the prior art.

MulteFire™ Alliance (MFA) is an organization dedicated to developing a Long Term Evolution (LTE) based communication technology for small cells operating exclusively in unlicensed spectrum, e.g., the global 5 Gigahertz (GHz) unlicensed band known as the Unlicensed National Information Infrastructure (U-NII) radio band.

MFA defines a Neutral Host Network (NHN) access mode. The NHN access mode is provided to mobile devices (mobiles) based on authorization from the mobile subscriber's preferred Participating Service Provider (PSP) that may or may not be a 3rd Generation Partnership Project (3GPP) type Mobile Network Operator. As a consequence, the mobile subscriber may or may not be provisioned with identity typical for the 3GPP subscriptions, e.g., the International Mobile Subscriber Identity (IMSI), in a licensed radio band network such as a 3GPP Evolved Packet Core (EPC) network. The IMSI is used to identify the user (mobile subscriber device) of a cellular network and is a unique identification associated with all cellular networks.

SUMMARY

Illustrative embodiments provide techniques for generating mobile session identifiers in communication networks such as, for example, generating an identifier for a mobile session of a mobile subscriber in a NHN according to a specific format. While such embodiments may be expected to provide, for example, improvements in performance and/or reduction of cost relative to conventional approaches, no particular result is a requirement of any embodiment unless explicitly recited in a particular claim.

For example, in one embodiment, a method includes the following steps. An identifier of a mobile session is generated for a mobile device accessing a network operating in an unlicensed radio band (e.g., NHN). Generation of at least one part of the identifier comprises generating a random binary value, converting the random binary value into a decimal value, and truncating the decimal value to a number of decimal digits consistent with an identifier recognizable by a network operating in a licensed radio band (e.g., 3GPP EPC).

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor configured to perform steps of the above-described method.

Advantageously, illustrative embodiments provide for generating of a mobile session identifier for a mobile subscriber in an NHN network that is consistent with an IMSI recognized by a 3GPP EPC network.

These and other features and advantages of embodiments described herein will become more apparent from the accompanying drawings and the following detailed description.

BRIEF DESCRIPTION OF THE DRAWINGS

FIG. 3 shows a mobile subscriber identifier format for use in generating a mobile subscriber identifier in a neutral host network architecture according to one embodiment.

FIG. 4 shows a methodology for generating a mobile session identifier for use in a neutral host network architecture according to one embodiment.

DETAILED DESCRIPTION

Illustrative embodiments will be described herein with reference to exemplary computing systems, data storage systems, communication networks, processing platforms, systems, user devices, network nodes, network elements, clients, servers, and associated communication protocols. However, it should be understood that embodiments are not limited to use with the particular arrangements described, but are instead more generally applicable to any environment in which it is desirable to provide mechanisms and methodologies for improved mobile session identifier generation in a communication network.

As mentioned above, the MFA is developing communication technology for small cells operating exclusively in unlicensed spectrum. For a mobile device operating in such a cell (referred to as an MF cell), there are currently two access modes contemplated: a public land mobile network (PLMN) access mode; and a neutral host network (NHN) access mode.

The PLMN access mode provides connectivity to Evolved Packet Cores (EPCs) of specific PLMNs. Mechanisms for the PLMN access mode are based on 3GPP Evolved Packet System (EPS) specifications, such as 3GPP TS 23.401, the disclosure of which is incorporated herein by reference in its entirety.

The NHN access mode provides connectivity to an Internet Protocol (IP) network. Mechanisms for the NHN access mode are generally based on 3GPP EPS specifications, such as 3GPP TS 23.401, with some Multefire-specific deviations.

The MF cell supports the PLMN access mode for specific PLMNs. When the MF cell supports the PLMN access mode for a PLMN, the cell broadcasts the corresponding PLMN identifier (ID). The MF cell is considered to be part of the PLMN whose PLMN-ID it broadcasts.

The MF cell supports the NHN access mode for a specific NHN. When the MF cell supports the NHN access mode for a specific NHN, the cell broadcasts a Neutral Host Access Mode Indicator (NHAMI) and a NHN-ID of the accessible NHN. The MF cell is considered to be part of the NHN whose NHN-ID it broadcasts.

The NHN architecture for the NHN access mode is based on 3GPP specifications such as TS 23.002 and TS 23.401, the disclosures of which are incorporated herein by reference in their entireties.

A mobile subscriber device or user equipment (UE) can attach to an MF cell simultaneously using both PLMN and NHN access modes if it is capable of maintaining multiple active radio resource control (RRC) connections (multiple radios, for example). Each instance of this attachment is recognized as a separate subscription entity by the network, and therefore is treated independently, as a separate UE.

Figure 1:
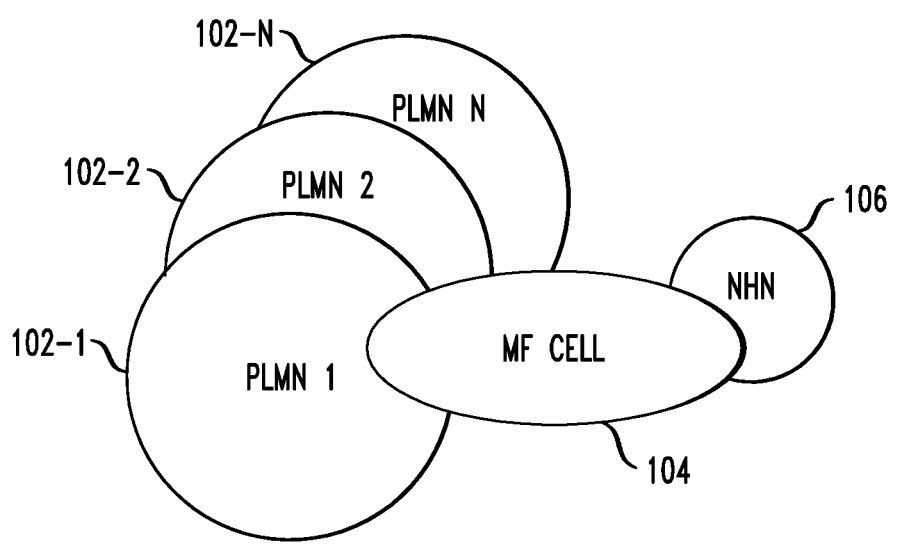
FIG. 1 shows relations between public land mobile networks, a cell, and a neutral host network according to one embodiment.

FIG. 1 shows a communication network environment 100 and the relationships between multiple PLMNs 102-1, 102-2, . . . , 102-N, an MF cell 104, and a NHN 106 according to one embodiment.

Like PLMNs, each NHN is a self-contained 'standalone' deployment. The NHN may support neutral host compliant UEs associated with a subscription from a remote PSP. The NHN allows a device to connect based on authentication and authorization provided by a remote AAA server, which is either a PSP AAA server or a 3GPP AAA server. Once authorized, the NHN provides the device with IP connectivity to an external IP network. The NHN's own Local AAA server is acting as an active single-point authentication, authorization, and accounting proxy towards the remote AAA server.

Figure 2:
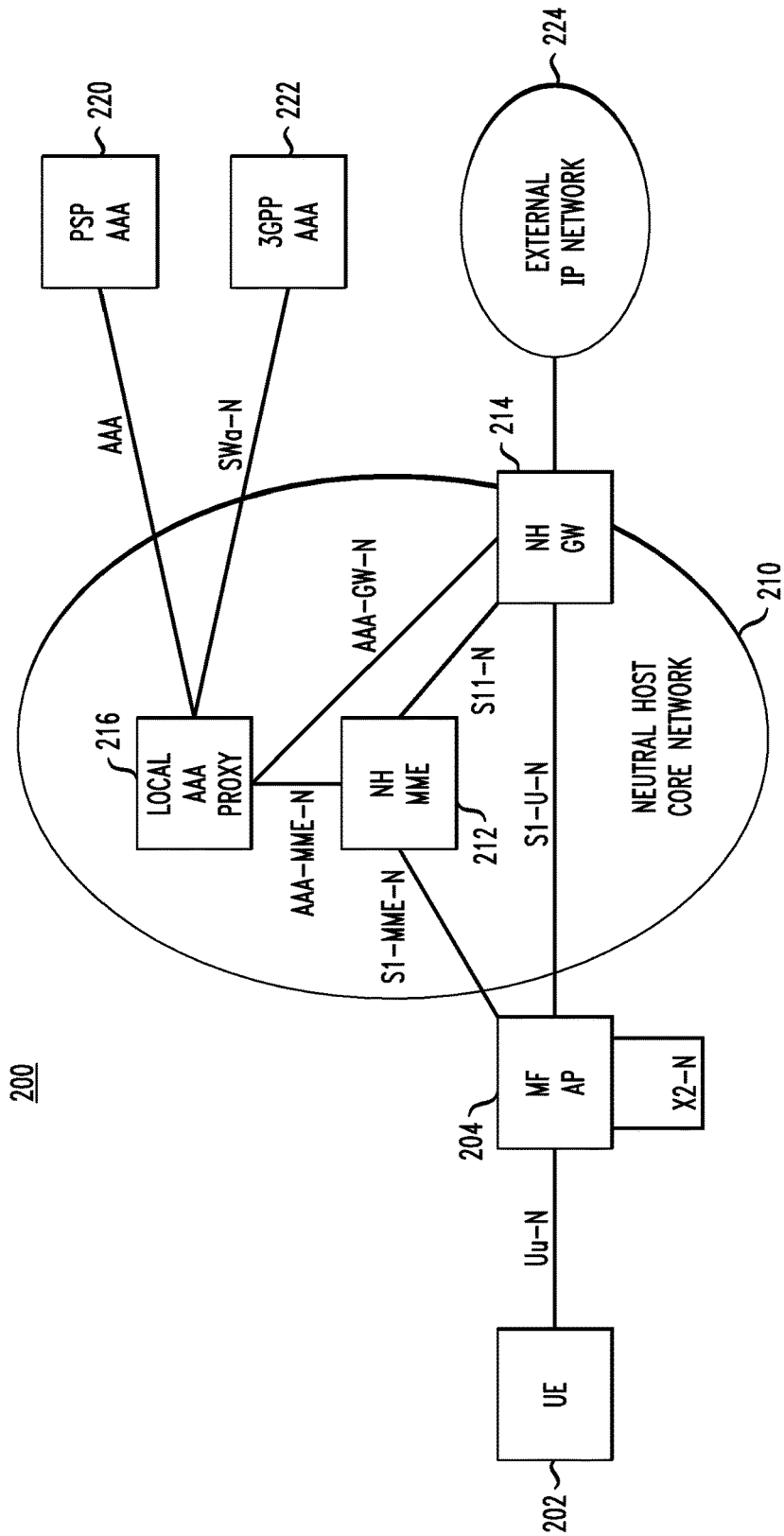
FIG. 2 shows a neutral host network architecture according to one embodiment.

FIG. 2 shows an NHN architecture 200 according to one embodiment. NHN architecture 200 is one implementation of NHN 106 shown in FIG. 1. As shown, NHN architecture 200 comprises the following network elements:

UE 202 which is a 3GPP UE that supports functions to operate in an MF cell;

MF AP 204 which is the MF cell access point;

NH MME 212 provides similar functionality within the neutral host core network 210 as a mobility management entity (MME) in EPC;

NH GW 214 provides similar functionality as a combined serving gateway and packet data network gateway (SGW/PGW) in EPC;

Local AAA Proxy 216 provides AAA proxy server functions as part of the NHN;

PSP AAA 220 provides AAA server functions using non-Universal Subscriber Identity Module (USIM) credentials that are associated with the PSP, and may be either internal or external to the NHN.

3GPP AAA 222 provides AAA server functions using USIM credentials that are external to the NHN, and provides similar functionality as an AAA in LTE networks.

External IP Network 224 is a network to which the NHN 210 provides IP connectivity for the UE 202.

It is to be appreciated that authentication is performed by the Remote PSP AAA server 220. The Local AAA Proxy server 216 is an NHN Point of Presence towards the PSP AAA. Within the NHN, the role of authenticator is performed by the NH MME 212. But as the Local AAA Proxy server 216 is an anchor for authentication, authorization and accounting for the NHN, the Local AAA Proxy server 216 assigns the identifier (referred to herein as a pseudo-IMSI or pIMSI) for the session when it receives the authorization (EAP SUCCESS) from the PSP AAA server 220.

The following is an illustrative description of the various reference points illustrated in NHN architecture 200:

S1-MME-N: Reference point for the control plane protocol between MF AP 204 and NH MME 212. The functionality of this reference point is similar to S1-MME reference point, which is defined in 3GPP TS 23.401 between E-UTRAN and MME.

S1-U-N: Reference point between MF AP 204 and NH GW 214. The functionality of this reference point is similar to S1-U reference point, which is defined in 3GPP TS 23.401 between E-UTRAN and Serving GW.

S11-N Reference point between NH MME 212 and NH GW 214. The functionality of this reference point is similar to S11 reference point, which is defined in 3GPP TS 23.401 between MME and Serving GW.

SWa-N: Reference point between the Local AAA Proxy 216 in the Neutral Host Core Network 210 and the 3GPP AAA 222. Functionality of this reference point is similar to SWa reference point, which is defined in 3GPP 23.402, the disclosure of which is incorporated herein in its entirety, between Untrusted Non 3GPP Access and 3GPP AAA Server.

AAA: Reference point between the Local AAA Proxy 216 in the Neutral Host Core Network 210 and the PSP AAA 222. The functionality of this reference point is to provide authentication, authorization, and accounting for the MF network based on non-USIM credentials external to the NHN.

AAA-MME-N: Reference point between the NH MME 212 and the Local AAA Proxy 216. The functionality of this reference point is to provide authentication and authorization for the MF network.

AAA-GW-N: Reference point between the NH GW 214 and the Local AAA Proxy 216. The functionality of this reference point is to provide accounting for MF network.

X2-N: Reference point between two MF APs 204. The functionality of this reference point is similar to X2 reference point, which is defined in 3GPP TS 36.300, the disclosure of which is incorporated herein by reference in its entirety, between eNBs.

Uu-N: Reference point between the MP AP 204 and the UE 202.

It is to be appreciated that since the architecture of the NHN is modeled after the 3GPP Evolved Packet Core (EPC) which requires an IMSI for various network operations and inter-node signaling, the MFA currently broadly defines a pseudo-IMSI (pIMSI) to be assigned to the mobile session within the NHN. However, a format of the pIMSI is not yet defined to be acceptable for the NHN core architecture.

The NHN architecture 200 supports several processes and protocols for a mobile subscriber device to attach to the network, and initiate, maintain, and terminate a communication session through the NHN. While the MFA is in the process of defining these several processes and protocols, illustrative embodiments focus herein on the generation of the above-mentioned pIMSI. Recall that, as explained above, the mobile subscriber may or may not be provisioned with identity typical for the 3GPP subscriptions, e.g., IMSI. However, the architecture of the NHN is modeled after the 3GPP EPC which requires an IMSI for various network operations and inter-node signaling. Thus, within the NHN, a pIMSI is assigned to the communication session of the mobile subscriber.

More particularly, upon successful completion of authentication, for example, via the Extensible Authentication Protocol, the Local AAA Proxy 216 creates a pIMSI for the communication session of the UE 202, and delivers it to the NH-MME 212. The pIMSI is stored at the NH-MME 212 and is used as a pointer to the UE 202 within the NHN core network 210. Note that the pIMSI shall be unique within the accessed NHN, and the pIMSI is not typically provided to the UE 202 itself.

Illustrative embodiments provide a methodology for generating a pIMSI for use by the NH core network 210.

In one embodiment, the pIMSI assigned by the Local AAA Proxy 216 in the NH core network 210 utilizes a 15 decimal digit format to allow protocol structure, header handling, address mapping, and information coding currently used in 3GPP EPC specifications and deployments.

In one embodiment, the pIMSI is constructed in the following way:

$$pIMSI=NHAMI|MSPN$$

wherein NHAMI refers to the above-mentioned Neutral Host Access Mode Indicator, and is a 6-digit identifier for the NHN access mode used in lieu of the PLMN-ID (3GPP EPC) used during the PLMN access mode; and wherein the MSPN refers to a Mobile Session PseudoNym and is a random combination of 9 digits allocated for the mobile session within the NHN and computed as follows:

$$MSPN=Truncate[Convert_{Binary-to-Decimal}(RAND)]$$

In this computation: RAND is the random value generated by the Local AAA Proxy server 216 for the current session; $Convert_{Binary-to-Decimal}$ is the process of converting the result of the computation to a decimal representation; and Truncate is a process that truncates the converted decimal result to the 9 digits of the expected MSPN number.

As defined in clause 8.3 of 3GPP TS 29.274, the disclosure of which is incorporated herein by reference in its entirety, the IMSI is transferred via GTP (GPRS Tunneling Protocol) tunnels. The sending entity copies the value part of the IMSI into the Value field of the IMSI information element (IE). IMSI is defined in 3GPP TS 23.003, the disclosure of which is incorporated herein by reference in its entirety.

FIG. 3 shows a typical IMSI format in table 300. Octets 5 to (n+4) represent the IMSI value in international number format as described in ITU-T Rec E.212, the disclosure of which is incorporated herein by reference in its entirety, encoded as telephony binary coded decimal (TBCD) digits, i.e., digits from 0 through 9 are encoded "0000" to "1001". When there is an odd number of digits, bits 8 to 5 of the last octet are encoded with the filler "1111". The maximum number of digits is 15.

Therefore, illustrative embodiments realize that it is advantageous that when the MFA Local AAA Proxy 216 randomly creates the MSPN of the pIMSI, the Local AAA Proxy 216 converts the result to a decimal digit format to match expectations of 3GPP EPC protocol elements coding.

Thus, in accordance with illustrative embodiments, the pIMSI assigned by the Local AAA Proxy 216 is advantageously assigned in a 15 decimal digit format to allow protocol structure, header handling, address mapping, and information coding currently used in 3GPP EPC specifications and deployments.

FIG. 4 shows a methodology for generating a mobile session identifier for use in a neutral host network architecture according to one embodiment.

As shown in methodology 400, the NHN core network 210 authenticates the UE 202 of a given mobile subscriber in step 402. Authentication can be done in a conventional manner such as, for example, using EAP authentication.

In step 404, the Local AAA Proxy 216 creates a pIMSI for the communication session of the UE 202. The pIMSI created for UE 202 is in the above-mentioned NHAMI MSPN format, which is advantageously converted to decimal representation to match expectations of 3GPP EPC protocol elements.

In step 406, the Local AAA Proxy 216 sends the pIMSI to the NH-MME 212.

In step 408, the pIMSI is stored at the NH-MME 212 and is used as a pointer to the UE 202 within the NHN core network 210.

Figure 5:
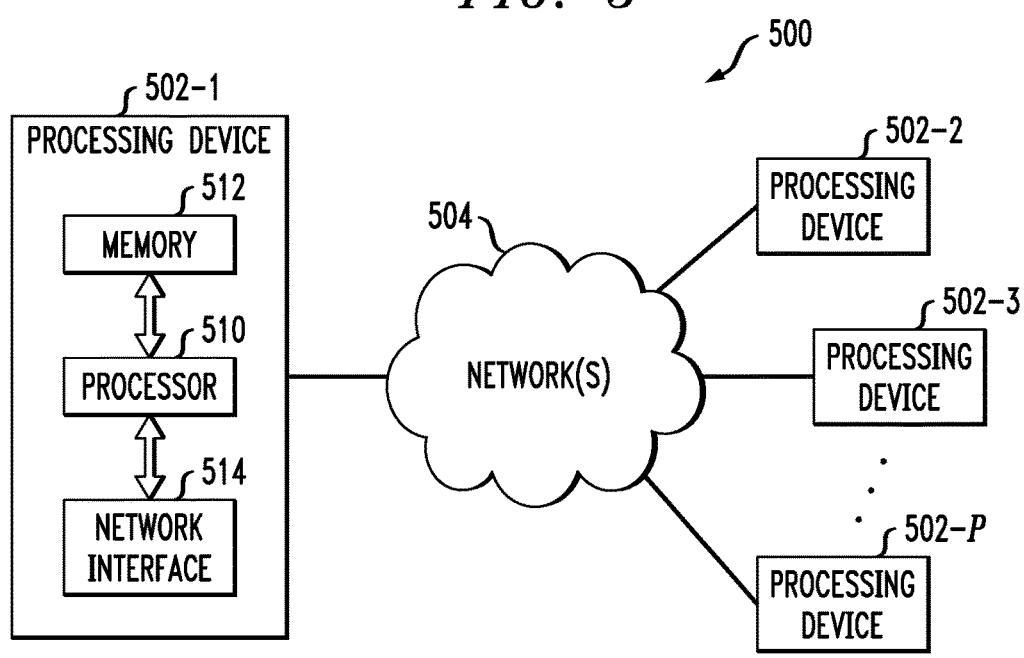
FIG. 5 shows a processing platform on which a neutral host network architecture is implemented according to one or more embodiments.

Turning now to FIG. 5, a processing platform is shown on which a network host network architecture (e.g., 200 in FIG. 2) is implemented according to one or more embodiments. The processing platform 500 in this embodiment comprises a plurality of processing devices denoted 502-1, 502-2, 502-3, . . . 502-P, which communicate with one another over a network 504. One or more of the components and/or modules of architecture 200 (e.g., UE, AP, MME, AAA, GW, etc.) may therefore each run on one or more computers or other processing platform elements, each of which may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of a system as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components of system 200 and steps of methodology 400. One skilled in the art would be readily able to implement such software given the teachings provided herein. Other examples of processor-readable storage media embodying embodiments may include, for example, optical or magnetic disks.

Also included in the processing device 502-1 is network interface circuitry 514, which is used to interface the processing device with the network 504 and other system components. Such circuitry may comprise conventional transceivers of a type well known in the art.

The other processing devices 502 of the processing platform 500 are assumed to be configured in a manner similar to that shown for processing device 502-1 in the figure.

The processing platform 500 shown in FIG. 5 may comprise additional known components such as batch processing systems, parallel processing systems, physical machines, virtual machines, virtual switches, storage volumes, logical units, etc. Again, the particular processing platform shown in FIG. 5 is presented by way of example only, and the architecture 200 of FIG. 2 may include additional or alternative processing platforms, as well as numerous distinct processing platforms in any combination.

Also, numerous other arrangements of servers, computers, storage devices or other components are possible. Such components can communicate with other elements of the system over any type of network, such as a wide area network (WAN), a local area network (LAN), a satellite network, a telephone or cable network, a storage network, a converged network or various portions or combinations of these and other types of networks.

Furthermore, it is to be appreciated that the processing platform 500 of FIG. 5 can comprise virtual machines (VMs) implemented using a hypervisor. A hypervisor is an example of what is more generally referred to herein as "virtualization infrastructure." The hypervisor runs on physical infrastructure. Processing platform 500 may also include multiple hypervisors, each running on its own physical infrastructure. As is known, VMs are logical processing elements that may be instantiated on one or more physical processing elements (e.g., servers, computers, processing devices). That is, a VM generally refers to a software implementation of a machine (i.e., a computer) that executes programs like a physical machine. Thus, different VMs can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other. As an alternative to VMs as virtual processing elements, containers can be employed, or some combination of both types of virtual processing elements.

Although certain illustrative embodiments are described herein in the context of communication networks utilizing particular communication protocols, other types of networks can be used in other embodiments. As noted above, the term "network" as used herein is therefore intended to be broadly construed. Further, it should be emphasized that the embodiments described above are for purposes of illustration only, and should not be interpreted as limiting in any way. Other embodiments may use different types of network, device and module configurations, and alternative communication protocols, process steps and operations for implementing a neutral host network architecture. The particular manner in which network nodes communicate can be varied in other embodiments. Also, it should be understood that the particular assumptions made in the context of describing the illustrative embodiments should not be construed as requirements of the inventions. The inventions can be implemented in other embodiments in which these particular assumptions do not apply. These and numerous other alternative embodiments within the scope of the appended claims will be readily apparent to those skilled in the art.

What is claimed is:

1. A method, comprising:
   generating an identifier of a mobile session for a mobile device accessing a network operating in an unlicensed radio band, wherein generating at least one part of the identifier comprises:
   generating a random binary value;
   converting the random binary value into a decimal value; and
   truncating the decimal value to a number of decimal digits consistent with an identifier recognizable by a network operating in a licensed radio band.

2. The method of claim 1, wherein the network operating in an unlicensed radio band comprises a Neutral Host Network.

3. The method of claim 1, wherein the network operating in a licensed radio band comprises a 3GPP Evolved Packet Core network.

4. The method of claim 1, wherein generating the mobile session identifier further comprises attaching at least another part of the identifier which uniquely identifies the network operating in an unlicensed radio band that generated the mobile session identifier.

5. The method of claim 4, wherein the mobile session identifier is generated in a fifteen decimal digit format wherein six decimal digits represent the part of the identifier that identifies the unlicensed radio band network, and nine decimal digits represent the part of the identifier generated by the generating, converting and truncating steps.

6. The method of claim 1, further comprising generating the mobile session identifier in a network element that serves as a local anchor for authentication, authorization, and accounting in the unlicensed radio band network.

7. The method of claim 6, further comprising sending the mobile session identifier to a network element that performs mobility management functions for the unlicensed radio band network.

8. The method of claim 7, further comprising storing the mobile session identifier at the mobility management network element for use as a pointer to the mobile device accessing the unlicensed radio band network.

9. The method of claim 1, further comprising authenticating the mobile device prior to generating the mobile session identifier.

10. An apparatus comprising:
    a memory; and
    a processor operatively coupled to the memory and configured to:
    generate an identifier of a mobile session for a mobile device accessing a network operating in an unlicensed radio band, wherein generating at least one part of the identifier comprise generating a random binary value, converting the random binary value into a decimal value, and truncating the decimal value to a number of decimal digits consistent with an identifier recognizable by a network operating in a licensed radio band.

11. The apparatus of claim 10, wherein the network operating in an unlicensed radio band comprises a Neutral Host Network.

12. The apparatus of claim 10, wherein the network operating in a licensed radio band comprises a 3GPP Evolved Packet Core network.

13. The apparatus of claim 10, wherein generating the mobile session identifier further comprises attaching at least another part of the identifier which uniquely identifies the network operating in an unlicensed radio band that generated the mobile session identifier.

14. The apparatus of claim 13, wherein the mobile session identifier is generated in a fifteen decimal digit format wherein six decimal digits represent the part of the identifier that identifies the unlicensed radio band network, and nine decimal digits represent the part of the identifier generated by the generating, converting and truncating steps.

15. The apparatus of claim 10, wherein the processor and memory are part of a network element that serves as a local anchor for authentication, authorization, and accounting in the unlicensed radio band network.

16. The apparatus of claim 15, wherein the processor and memory are further configured to send the mobile session identifier to a network element that performs mobility management functions for the unlicensed radio band network such that the mobile session identifier is stored at the mobility management network element for use as a pointer to the mobile device accessing the unlicensed radio band network.

17. The apparatus of claim 10, wherein the processor and memory are further configured to authenticate the mobile device prior to generating the mobile session identifier.

18. An article of manufacture comprising a processor-readable non-transitory storage medium having embodied therein executable program code that when executed by the processing device causes the processing device to perform steps of:
   generating an identifier of a mobile session for a mobile device accessing a network operating in an unlicensed radio band, wherein generating at least one part of the identifier comprises:
      generating a random binary value;
      converting the random binary value into a decimal value; and
      truncating the decimal value to a number of decimal digits consistent with an identifier recognizable by a network operating in a licensed radio band.

19. The article of claim 18, wherein the network operating in an unlicensed radio band comprises a Neutral Host Network.

20. The article of claim 18, wherein the network operating in a licensed radio band comprises a 3GPP Evolved Packet Core network.

21. The article of claim 18, wherein generating the mobile session identifier further comprises attaching at least another part of the identifier which uniquely identifies the network operating in an unlicensed radio band that generated the mobile session identifier.

22. The article of claim 21, wherein the mobile session identifier is generated in a fifteen decimal digit format wherein six decimal digits represent the part of the identifier that identifies the unlicensed radio band network, and nine decimal digits represent the part of the identifier generated by the generating, converting and truncating steps.

23. The article of claim 18, further comprising generating the mobile session identifier in a network element serves as a local anchor for authentication, authorization, and accounting in the unlicensed radio band network.

24. The article of claim 23, further comprising sending the mobile session identifier to a network element that performs mobility management functions for the unlicensed radio band network.

25. The article of claim 24, further comprising storing the mobile session identifier at the mobility management network element for use as a pointer to the mobile device accessing the unlicensed radio band network.

26. The article of claim 18, further comprising authenticating the mobile device prior to generating the mobile session identifier.

27. The method of claim 4, wherein the mobile session identifier is generated in a decimal digit format comprising a first set of decimal digits representing the part of the identifier that identifies the unlicensed radio band network and a second set of decimal digits representing the part of the identifier generated by the generating, converting and truncating steps.

* * * * *